US012397399B2

(12) United States Patent
Girrbach et al.

(10) Patent No.: US 12,397,399 B2
(45) Date of Patent: Aug. 26, 2025

(54) DRIVE UNIT FOR A PRESS COLLAR

(71) Applicant: Novopress GmbH Pressen und Presswerkzeuge & Co. KG, Neuss (DE)

(72) Inventors: Jens Girrbach, Neuss (DE); Paul Spitz, Hilden (DE)

(73) Assignee: Novopress GmbH Pressen und Presswerkzeuge & Co. KG, Neuss (DE)

( * ) Notice: Subject to any disclaimer, the term of this patent is extended or adjusted under 35 U.S.C. 154(b) by 208 days.

(21) Appl. No.: 17/924,228

(22) PCT Filed: Apr. 28, 2021

(86) PCT No.: PCT/EP2021/061172

§ 371 (c)(1),
(2) Date: Nov. 9, 2022

(87) PCT Pub. No.: WO2021/228556

PCT Pub. Date: Nov. 18, 2021

(65) Prior Publication Data

US 2023/0127551 A1 Apr. 27, 2023

(30) Foreign Application Priority Data

May 14, 2020 (DE) ..................... 20 2020 102 724.7

(51) Int. Cl.
*B25B 27/00* (2006.01)
*B25B 27/10* (2006.01)

(52) U.S. Cl.
CPC .................................... *B25B 27/10* (2013.01)

(58) Field of Classification Search
CPC .......... B25B 27/00; B25B 27/10; B25B 27/14
See application file for complete search history.

(56) References Cited

U.S. PATENT DOCUMENTS

| | | | | |
|---|---|---|---|---|
| 4,982,627 | A * | 1/1991 | Johnson | B23B 31/005 81/177.1 |
| 6,044,681 | A | 4/2000 | Frenken | |
| 6,044,686 | A | 4/2000 | Dischler | |
| 6,393,950 | B1 * | 5/2002 | Crosser | B25B 13/56 81/177.1 |
| 2002/0056308 | A1 | 5/2002 | Frenken | |
| 2003/0230130 | A1 | 12/2003 | Bowles et al. | |

(Continued)

FOREIGN PATENT DOCUMENTS

| | | | |
|---|---|---|---|
| CN | 207208529 | U | 4/2018 |
| DE | 10107579 | A1 | 5/2002 |

(Continued)

*Primary Examiner* — Lee D Wilson
(74) *Attorney, Agent, or Firm* — The Webb Law Firm

(57) ABSTRACT

The present invention relates to a drive unit for use with a press collar for pressing two workpieces, including a drive and pressing pliers connected to the drive, the pressing pliers having two jaws. In one embodiment, the jaws of the pressing pliers can be moved toward each other via the drive in order to close the press collar and to press the two workpieces. Furthermore, the two jaws each have a first connecting element for connecting to a second connecting element of the press collar. At least one of the first connecting elements is at least partly surrounded by a marking.

8 Claims, 3 Drawing Sheets

(56) References Cited

U.S. PATENT DOCUMENTS

| | | | | |
|---|---|---|---|---|
| 2011/0296669 | A1* | 12/2011 | Marovets | G09F 3/00 29/284 |
| 2014/0209474 | A1* | 7/2014 | Lin | B23P 15/00 205/121 |
| 2017/0225218 | A1* | 8/2017 | Cho | B21D 39/046 |
| 2020/0127429 | A1* | 4/2020 | Ruch | B25B 27/10 |
| 2020/0271249 | A1* | 8/2020 | Chen | B25B 27/10 |
| 2021/0008611 | A1* | 1/2021 | Krause | B25B 27/10 |
| 2021/0129310 | A1* | 5/2021 | Barezzani | B23D 29/00 |
| 2022/0288754 | A1* | 9/2022 | Zhou | B25B 27/10 |
| 2023/0127551 | A1* | 4/2023 | Girrbach | B25B 27/10 29/244 |

FOREIGN PATENT DOCUMENTS

| | | | |
|---|---|---|---|
| DE | 202005008125 | U1 | 10/2006 |
| DE | 202007013586 | U1 | 2/2008 |
| EP | 1535677 | B1 | 9/2007 |
| EP | 1974836 | A2 | 10/2008 |
| EP | 2848369 | A2 | 3/2015 |
| EP | 3563945 | A1 | 11/2019 |
| WO | 2006057962 | A1 | 6/2006 |

* cited by examiner

DRIVE UNIT FOR A PRESS COLLAR

CROSS-REFERENCE TO RELATED APPLICATIONS

This application is the United States national phase of International Application No. PCT/EP2021/061172 filed Apr. 28, 2021, and claims priority to German Patent Application No. 20 2020 102 724.7 filed May 14, 2020, the disclosures of which are hereby incorporated by reference in their entirety.

BACKGROUND OF THE DISCLOSURE

Field of the Disclosure

The present disclosure relates to a drive unit for use with a press collar for pressing two workpieces, as well as to a system with such a drive unit and such a press collar.

Description of Related Art

From EP 2848369, a press collar is known in which a plurality of press elements are connected in an articulate and chain-like manner by bolts. Here, each press element comprises press collar segments arranged in parallel, which extend from one bolt to the next bolt. The press collar segments of successive press elements of the press collar are arranged in an offset manner. A force transmission is effected from one press element onto the next via the press collar elements.

A connecting bolt is provided with the first press element and the last press element, respectively. An in particular electrohydraulic drive unit can be connected to this connecting bolt. For this purpose, the drive unit comprises pressing pliers with two jaws. The jaws of the pressing pliers can be moved towards each other using a drive of a drive unit. Here, each of the jaws has a recess for receiving a connecting bolt, so that the movement of the jaws is transferred to the press collar. By moving the jaws of the pressing pliers towards each other, the two ends of the press collar are moved towards each other, the radius of the press collar is reduced and the two workpieces are pressed thereby.

Here, the user himself has to connect the press collar to the pressing pliers of the drive unit, in particular by inserting the connecting bolts into the respective recess of the drive unit. This may cause errors, in particular since the recess can possibly be covered by a press collar element, so that an optical check of the correct fit of the connecting bolt in the respective recess may potentially not be possible or only with difficulty. However, if the connecting bolt is not fully inserted into the recess of the jaw, this may cause damage to the jaw of the pressing pliers and even a complete destruction or, in case of a sudden disengagement of the connecting bolt from the recess of the jaw, may even entail a risk of injury to the user.

SUMMARY OF THE DISCLOSURE

It is an object of the present disclosure to provide a drive unit in which a safe connection with a press collar is ensured.

The object is achieved by the drive unit for use with a press collar for pressing two workpieces as described herein, as well as by the system comprising such a drive unit and a corresponding press collar as described herein.

The drive unit according to the disclosure for use with a press collar for pressing two workpieces comprises a drive and pressing pliers connected to the drive, the connecting pliers having two jaws. By means of the drive, the jaws of the pressing pliers can be moved towards each other to close the press collar and to press the two workpieces. Furthermore, the two jaws each comprise a first connecting element for connecting to a second connecting element of a press collar. A force transmission of the force of the drive via the pressing pliers to the press collar is ensured thereby. According to the present disclosure at least one of the first connecting elements is at least partly surrounded by a marking. In particular, at least one of the first connecting elements is completely surrounded by a marking. The marking allows for an easier estimation of the relative position between the second connecting element of the press collar and the first connecting element of the jaws of the pressing pliers. Based on the visual indication provided by the marking applied, the user is thus able to visually ensure that a correct and full connection of the second connecting element with the first connecting element is guaranteed.

Preferably, the size of the marking is adapted to a press collar element of the press collar, the marking being covered completely by the press collar element only if the second connecting element is fully connected with the first connecting element. The press collar element connected with the second connecting element of the press collar has a known width. If the second connecting element of the press collar is connected with the first connecting element of the jaw of the drive unit, the press collar segment covers the marking completely. Thus, the user is given a visual indication. As long as the marking is still visible, the second connecting element of the press collar is not completely connected with the first connecting element of the jaw. Only when the marking is completely covered by the press collar element, a safe connection of the second connecting element with the first connecting element of the jaw. Thereby, the user is given a simple and clear indication that ensures the safe use of the press collar with the drive unit.

Preferably, both first connecting elements are each surrounded by a marking, so that the safe fit of both second connecting elements of the press collar in the respective first connecting elements is visually clearly recognizable.

Preferably, the first connecting element is designed as a recess, in particular for receiving a second connecting element designed as a connecting bolt or the like. As an alternative, the first connecting element is designed as a pin, a protrusion or the like, which can be connected with a second connecting element of the press collar that is designed, in particular, as a recess.

Preferably, the marking is a color marking, a surface embossing, a sticker or a lasered surface structure. In particular a surface embossing and a lasered surface structure have the advantage that they cannot be rubbed off and are thus provided permanently on the jaw of the pressing pliers.

Preferably, the marking is surrounded by a further marking. Here, in particular the further marking is arranged radially around the original marking. The further marking has a size that is covered completely by a press collar element of a further press collar only if a third connecting element of the further press collar is fully connected with the first connecting element. Thus, due to the further marking, it is possible to use another press collar, the press collar segments of which have a different dimension. In order to ensure a safe connection of the respective second or third connecting element with the first connecting element, the original first marking has to covered completely for a first press collar, whereas the further marking has to covered completely for a second, further press collar.

Moreover, the disclosure relates to a system comprising a drive unit as described above and a press collar for connection with the drive unit. Here, the press collar comprises a plurality of pressing elements connected in an articulate and chain-like manner by bolts. Each press element comprises a plurality of press collar segments arranged in parallel, which extend from one bolt to the next bolt of the respective press element. A second connecting element is provided at each of the first pressing element and the second pressing element for connection with the first connecting element of the drive unit.

Preferably, the press collar elements are each of a plate-shaped design and extend laterally beyond the second connecting element and also beyond the respective bolts between the pressing elements.

Preferably, the drive unit is connected with the respective second connecting element below the respective topmost press collar segment. Thus, at least the topmost press collar segment of the press collar covers the first connecting element of the jaw, when seen in top plan view. If the second connecting element is correctly and completely connected with the first connecting element of the jaw, at least the topmost press collar element also completely covers the marking provided. In particular, the jaw of the pressing pliers engages between two respective press collar segments and is connected with the second connecting element of the press collar between those two press collar segments.

The system preferably comprises a plurality of different press collars, wherein all press collars are designed identically in the region of the respective connecting elements, i.e. the lateral dimension of the respective press collar segments is identical, so that, due to the marking being covered completely by the respective press collar segment of the different press collars, a correct connection of the second connecting element with the first connecting element of the jaw can be concluded therefrom.

As an alternative, the system comprises a plurality of different press collars, wherein at least two press collars are designed differently in the region of the respective second connecting elements, so that a first marking is covered by a press collar element of a first press collar, whereas a further marking, which in particular surrounds the first marking, is covered by a press collar element of a further press collar.

BRIEF DESCRIPTION OF THE DRAWINGS

In the following, the disclosure is described in more detail by means of a preferred embodiment with reference to the accompanying figures.

In the figures.

DESCRIPTION OF THE DISCLOSURE

Figure 1:
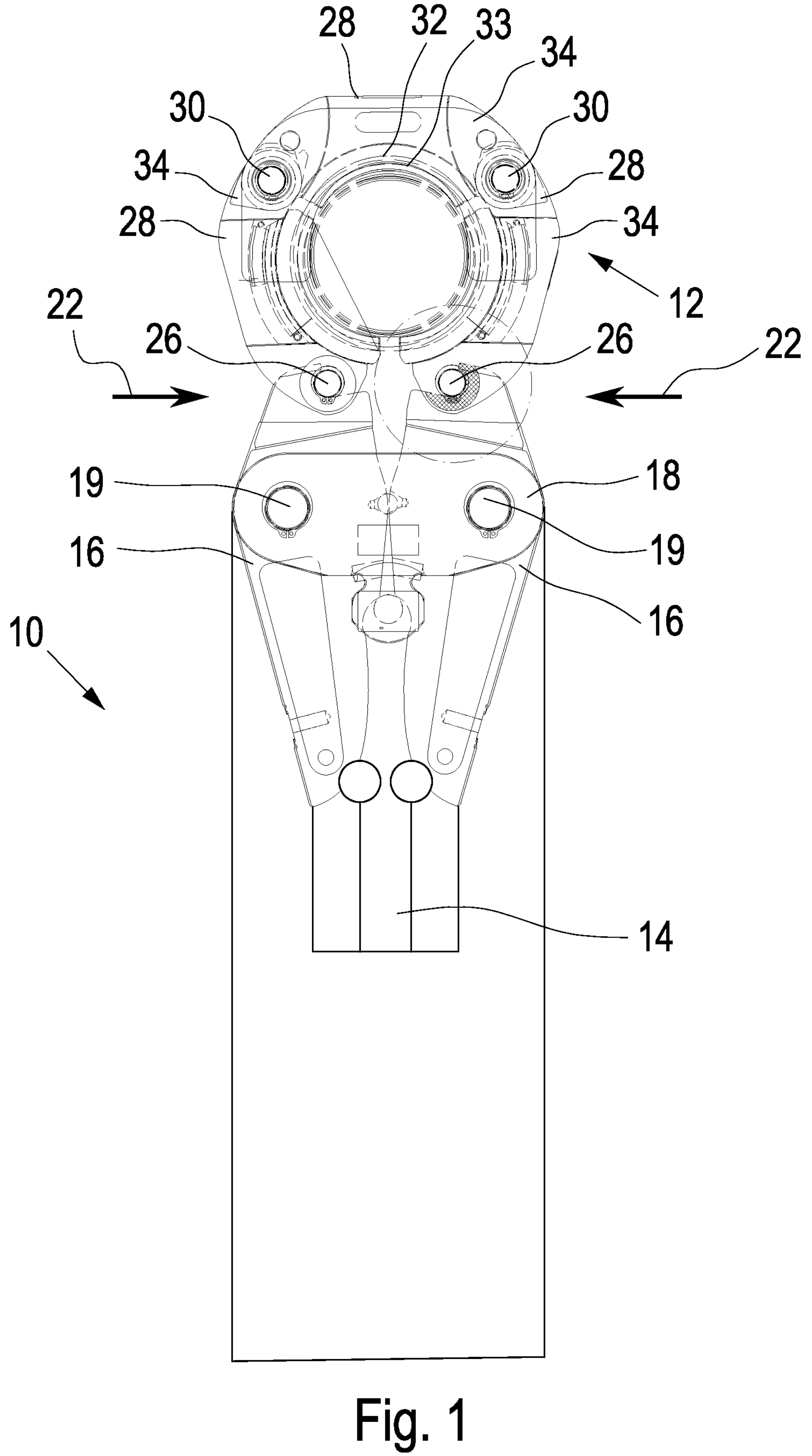
FIG. 1 is a schematic top plan view of a drive unit with a press collar.

FIG. 1 shows the drive unit 10, as well as the press collar 12. The drive unit 10 has a drive (not illustrated) which may, in particular, be electrohydraulic. The drive displaces a piston 14, whereby jaws 16 of a press collar 18 are moved about respective rotational axes 19, so that the end of the pressing pliers 18 facing away from the drive move the jaws 16 towards each other as indicated by the arrows 22.

The jaws 16 comprise first connecting elements which are designed as recesses 24 (FIG. 2), for connection with second connecting elements of the press collar 12 which are designed as connecting bolts 26. As an alternative thereto, the first connecting element and the second connecting element may have different shapes, with the shape of the first connecting element and the second connecting element always being designed to ensure force transmission from the drive unit 10 to the press collar 12. In particular, the first connecting element and the second connecting element have congruent shapes so as to provide at least a partial positive engagement.

In the example of FIG. 1, the press collar 12 has three pressing elements 28, which are connected with each other in a chain-like and articulate manner via bolts 30. Here, the press elements 28 have common pressing surfaces 32 on the inner side, which come into contact with the workpieces 33 to press the workpieces 33. Furthermore, the pressing elements 28 comprise press collar segments 34 extending between the bolts 26, 30. Here, the press collar segments 34 are designed, in particular, to be plate-shaped. The jaw 16 of the pressing pliers 18 engages below the topmost press collar segment 34 to connect the recess 24 of the jaw 16 with the respective connecting bolt 26, so that a part of the jaw 16 is covered by the topmost press collar segment 34.

By the drive of the drive unit 10, the jaws 16 of the pressing pliers 18 are moved towards each other as indicated by the arrows 22. This movement is transmitted to the press collar 12 via the connecting bolts 26, whereby the radius of the press collar 12 decreases and a pressing of the workpieces 33 is performed.

Figure 2:
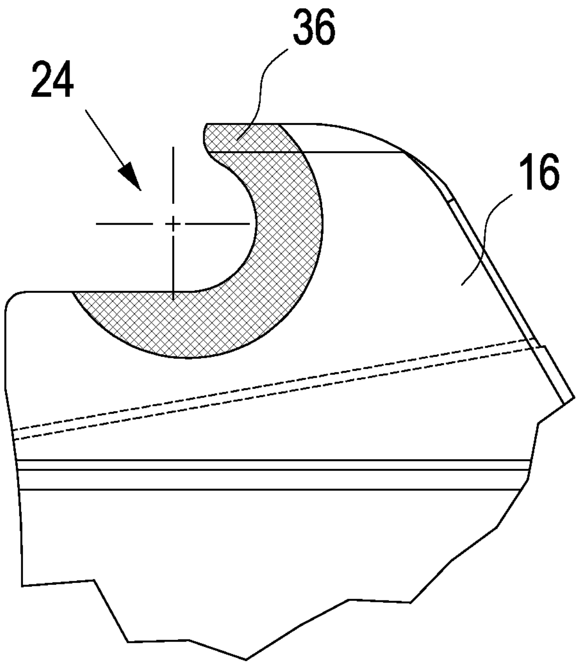
FIG. 2 is a detail of the jaw of the drive unit.
Figure 3A:
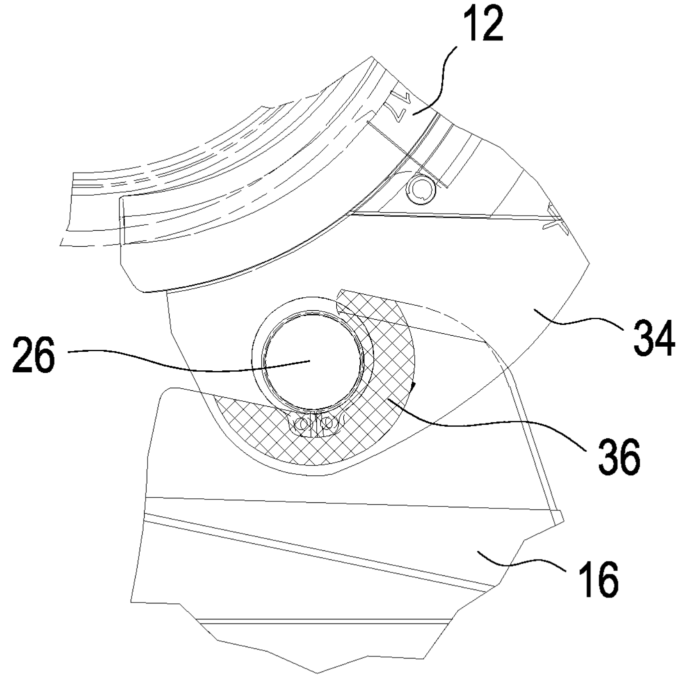
FIGS. 3A and 3B show a detail.

According to FIG. 2, the recess 24 is surrounded at least in part and in particular completely by a marking 36. This marking has a size adapted to the size of the press collar segments 34 of the press collar 12. As schematically shown in FIG. 3A, the press collar segment 34 covers the marking 36 completely, given a correct fit of the connecting bolt 26 in the recess 24 of the jaw 16. Thereby, the user is given a visual indication that the connecting bolt 26 is arranged correctly in the recess 24 and that a safe handling of the system is thus guaranteed.

Figure 3B:
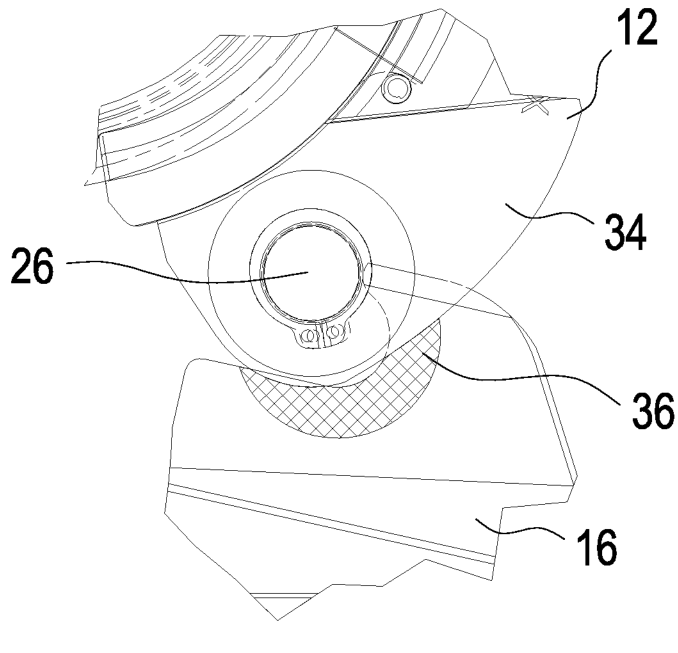

FIG. 3B shows the situation in which the connecting bolt 26 is not correctly arranged in the recess 24. Furthermore, the press collar segment 34 of the press collar 12 covers the jaw 16 in part, so that the user can hardly or not at all see the recess 24. Therefore, checking the correct fit of the connecting bolt 26 in the recess 24 is made difficult. However, by applying the marking 36, the user can clearly and directly see that the connecting bolt is not yet fully and correctly received in the recess 24. Thus, the user has the opportunity to adjust the fit of the connecting bolt 26, and in particular the connection of the press collar 12, with the drive unit 10. Thereby, a damage to the jaw 16 or an injury to the user is avoided.

The invention claimed is:

1. A drive unit for use with a press collar for pressing two workpieces, comprising:

a drive; and pressing pliers connected to the drive, wherein the pressing pliers comprises two jaws, wherein the jaws of the pressing pliers can be moved towards each other by the drive in order to close the press collar and to press the two workpieces, wherein the two jaws each comprise a first connecting element for connection with a second connecting element of the press collar, and wherein at least one of the first connecting elements is surrounded at least in part by a marking, wherein a size of the marking is adapted to a press collar segment of the press collar, and wherein the marking is covered completely by the press collar segment only if the second connecting element of the press collar is fully connected with the first connecting element.

2. The drive unit according to claim 1, wherein both of the first connecting elements are each surrounded by one marking.

3. The drive unit according to claim 1, wherein the marking is a color marking, a surface embossing, a sticker, or a lasered surface.

4. A system comprising a drive unit according to claim 1 and a press collar for connection with the drive unit, wherein the press collar comprises a plurality of pressing elements connected in an articulate and chain-like manner by means of bolts, wherein each pressing element has a plurality of press collar segments arranged in parallel, which extend from one bolt to the next bolt, and wherein a second connecting element is provided at each of the first pressing element and the last pressing element for connection with the first connecting element of the drive unit.

5. The system according to claim 4, wherein the press collar segments are each designed in a plate-shape and extend laterally beyond the second connecting elements.

6. The system according to claim 4, wherein the drive unit is connected with the respective second connecting element below the respective topmost press collar segment.

7. The system according to claim 4, wherein a plurality of different press collars, and wherein, for all press collars, the press collar segments are designed identically in the region of the second connecting elements.

8. A drive unit for use with a press collar for pressing two workpieces, comprising:

a drive; and pressing pliers connected to the drive, wherein the pressing pliers comprise two jaws, each having a first connecting element for connection with a second connecting element of the press collar, wherein at least one of the first connecting elements is surrounded by a marking, and wherein the marking is surrounded by a further marking, such that the further marking is completely covered by a press collar segment of a further press collar only if a third connecting element of the further press collar is fully connected with the first connecting element.

* * * * *